(12) United States Patent
 Ejlersen et al.

(10) Patent No.: US 10,515,420 B2
(45) Date of Patent: Dec. 24, 2019

(54) METHOD, SYSTEM AND SOFTWARE PROGRAM FOR HANDLING AND STORING PURCHASE TRANSACTIONS BETWEEN A USER AND A POINT-OF-SALE

(71) Applicants: Anders Michael Juul Ejlersen, Oxford (GB); Kristoffer Stellini Juul Ejlersen, Oxford (GB); Frederik Stellini Juul Ejlersen, Oxford (GB)

(72) Inventors: Anders Michael Juul Ejlersen, Oxford (GB); Kristoffer Stellini Juul Ejlersen, Oxford (GB); Frederik Stellini Juul Ejlersen, Oxford (GB)

(*) Notice: Subject to any disclaimer, the term of this patent is extended or adjusted under 35 U.S.C. 154(b) by 556 days.

(21) Appl. No.: 14/532,382

(22) Filed: Nov. 4, 2014

(65) Prior Publication Data
US 2016/0110821 A1   Apr. 21, 2016

Related U.S. Application Data

(60) Provisional application No. 62/065,042, filed on Oct. 17, 2014.

(51) Int. Cl.
 *G06Q 40/00* (2012.01)
 *G06Q 20/20* (2012.01)
 (Continued)

(52) U.S. Cl.
 CPC .......... *G06Q 40/12* (2013.12); *G06Q 20/20* (2013.01); *G06Q 20/209* (2013.01);
 (Continued)

(58) Field of Classification Search
 CPC ......... G06Q 20/20; G06Q 40/10; G06Q 40/12
 (Continued)

(56) References Cited

U.S. PATENT DOCUMENTS

2002/0188561 A1   12/2002  Schultz
2003/0115135 A1*  6/2003  Sarfraz ............. G06Q 20/0453
                                                  705/39
(Continued)

FOREIGN PATENT DOCUMENTS

GB      2358723 A    8/2001
WO      9922327 A1   5/1999
(Continued)

OTHER PUBLICATIONS

Search Report dated Oct. 9, 2015 from the Danish Patent Office, 4 pages.

*Primary Examiner* — Florian M Zeender
*Assistant Examiner* — Christopher R Buchanan
(74) *Attorney, Agent, or Firm* — Morse, Barnes-Brown & Pendleton, PC.; Sean D. Detweiler

(57) ABSTRACT

A method and system for managing and storing purchase transactions between a users' computing device and a point-of-sales computing device is described. The method comprises the steps of: a user purchasing an item from a point-of-sale, the point-of-sale computing device generating an electronic receipt related to the item. The point-of sale transmits the electronic receipt to a users' computer based accounting system programmed for performing bookkeeping operations related to purchase transactions. The accounting system stores the electronic receipt, extracts price and purchase transaction information about the item. The accounting system analyzes the price and information for automatically updating accounting records of the user in real time.

8 Claims, 2 Drawing Sheets

(51) Int. Cl.
*G06Q 30/00* (2012.01)
*G06Q 30/02* (2012.01)

(52) U.S. Cl.
CPC ....... *G06Q 30/012* (2013.01); *G06Q 30/0255* (2013.01); *G06Q 40/10* (2013.01)

(58) Field of Classification Search
USPC .................................................... 705/16, 30
See application file for complete search history.

(56) References Cited

U.S. PATENT DOCUMENTS

| | | |
|---|---|---|
| 2003/0126020 A1 | 7/2003 | Smith et al. |
| 2004/0117301 A1* | 6/2004 | Fujisawa ................ G06Q 20/04 705/39 |
| 2004/0225567 A1 | 11/2004 | Mitchell et al. |
| 2011/0034155 A1 | 2/2011 | Kamamoto |
| 2011/0087550 A1* | 4/2011 | Fordyce, III ........... G06Q 30/02 705/14.65 |
| 2011/0125598 A1* | 5/2011 | Shin ....................... G06Q 10/10 705/17 |
| 2012/0011071 A1 | 1/2012 | Pennock et al. |
| 2012/0047052 A1* | 2/2012 | Patel ...................... G06Q 40/00 705/30 |
| 2012/0109693 A1* | 5/2012 | Smith .................. G06Q 20/204 705/4 |
| 2012/0290422 A1 | 11/2012 | Bhinder |
| 2012/0290484 A1 | 11/2012 | Maher |
| 2013/0204727 A1 | 8/2013 | Rothschild |
| 2014/0006198 A1 | 1/2014 | Daly et al. |
| 2014/0195361 A1 | 7/2014 | Murphy et al. |
| 2014/0229305 A1 | 8/2014 | Ellan |
| 2014/0249970 A1* | 9/2014 | Susaki ............... G06Q 20/0453 705/30 |

FOREIGN PATENT DOCUMENTS

| | | |
|---|---|---|
| WO | 0111539 A1 | 2/2001 |
| WO | 0114995 A2 | 3/2001 |
| WO | 2005/091235 A1 | 9/2005 |

* cited by examiner

METHOD, SYSTEM AND SOFTWARE PROGRAM FOR HANDLING AND STORING PURCHASE TRANSACTIONS BETWEEN A USER AND A POINT-OF-SALE

CROSS REFERENCE TO RELATED APPLICATIONS

This application claims priority in U.S. Provisional Patent application No. 62/065,042, filed 17 Oct. 2014.

FIELD OF THE INVENTION

The present invention relates to a method, system, and software program for handling and storing purchase transactions between a user and point-of-sales.

BACKGROUND OF THE INVENTION

Currently, a user, e.g. a private consumer or firm or other, may purchase and/or pay for an item (a physical or non-physical product or service) from a point-of-sale, said point-of-sale e.g. being a physical shop or an online shop or an account. The point-of-sale prints a physical receipt, and/or emails an electronic receipt and possible a warranty in the form of a pdf-document or similar, alternatively the receipt has to be downloaded from a website.

The user following has to balance the receipt against a credit account or debit account in order to ensure that the amount is correct and also to ensure that no other amounts have erroneously been withdrawn from the account. If the user further wants the amount to appear as an entry in a private accounting or in all links and parts of a firm's bookkeeping records, the amount and possible receipt and information about the purchased item need to be manually entered into the private accounting or bookkeeping records.

Further, the receipt and warranty need to be archived either physically or electronically. If the receipt and warranty has been received in electronic form from the point-of-sale, the electronic receipt and warranty may simply be stored electronically on a computer or server, e.g. in a dedicated folder. If the receipt has been printed, the receipt needs to be scanned or photographed and subsequently stored on the computer or server.

If the user wants to receive offers and/or advertisements from the point-of-sale, and/or the point-of-sale wants to send offers and/or advertisements to the user, it is possible to sign up for a newsletter or the like. However, it is not readily possible to receive targeted offers and/or advertisements from the point-of-sale directly following the purchase or the payment.

Overall, the many steps involved in balancing accounts, storing receipts etc. are very time consuming and tedious for a private consumer and even more so as regards cost for firms that have a very large number of purchases and where the purchased items need to be stored and categorised for accounting and tax purposes, not least when employees are using credit or debit cards to pay for travel tickets and car hire and fuel and restaurants and hotels and more. The employee needs to keep all the receipts, and then normally on a monthly basis he or she must account for the amounts spent by balancing the monthly statement against the kept receipts. The firm must then receive and handle and post and balance all transactions, and store all receipts.

SUMMARY OF THE INVENTION

It is an object of the invention to provide an alternative method and system for handling purchase transactions, which overcome or ameliorate at least one of the disadvantages of the prior art or which provide a useful alternative.

It is a further object of the invention to provide a method and system, which automatically handles storage of receipts and bookkeeping.

It is a further object of the invention to provide a method and system, which automatically handles and stores warranties of purchased items.

It is a further object of the invention to provide a computer supported platform for the point-of-sale to send offers and/or advertisements to the user, directly following the purchase or the payment.

This is achieved according to a first aspect of the invention by a method for handling and storing purchase transactions between a users' computing device and a point-of-sale computing device, wherein the method comprises the steps of:

a) the user purchasing an item from a point-of-sale,
b) providing the point-of-sale with a computing device having electronic communication capability and electronic storage capability and software executable on the computing device and being programmed for generating an electronic receipt related to said purchase of said item,
c) generating an electronic receipt related to the purchase of the item and transmitting the electronic receipt to the users' computing device;
d) the point-of sale computing device electronically sending a price and purchase transaction information about the item, and the electronic receipt to a said users' computing device which supports operation of a computer based accounting system which includes software executable on a computing device and being programmed for performing bookkeeping of purchase transactions,
e) said computer based accounting system storing the electronic receipt,
f) if the price and purchase transaction information about the item are not sent separately under d), then said computer based accounting system extracting price and information about the item from the electronic receipt, and
g) said accounting system storing the price and information in a bookkeeping module, and analyzing the price and information for updating accounting records of the user.

Thereby, the invention provides a method, where a purchased item may automatically be entered into accounts, and where balancing of bookkeeping records and accounts is automatically carried out upon a purchase of an item, or carried out by the user immediately following the purchase of the item. Further, the receipts are automatically stored, or stored by the user immediately following the purchase of the item, whereby the user can check the receipts for possible errors.

The bookkeeping, balancing and storage may be carried out in real-time, whereby the user can instantly access his or her account to check the records.

For the point-of-sale, the method has the advantage that physical receipts do not have to be printed, and for the user, the method has the advantage that it is not necessary to receive and store physical receipts. Further, it is an advantage that the user does not have to enter purchases into accounts or to spend time balancing accounts.

The bookkeeping module preferably comprises an account associated with the user, more preferably an account associated with a user profile created by the user.

The user may be a private consumer or a firm.

In practice the method may be managed by a software program integrated on a server or cloud. The user may have a front end, e.g. in form of a software application installed on a smart device, such as a smart phone or a tablet, where the user can access the associated user profile and account. The software may also be installed on a PC or a Mac or be web-based so that the user can access the account from anywhere. The software may be based on PC, Unix, IOS, Android or any other suitable platform.

The electronic receipt and other information may be sent various electronic forms, such as by email, text message, MMS, or the like.

According to a preferred embodiment, the point-of-sale computing device further generates an electronic warranty and sends the electronic warranty to the accounting system. Thereby, the invention will also electronically store item warranties, and the user can always gain access to the warranties, if the purchased item becomes defect within the warranty period.

The electronic receipt may for instance be stored in a first module of the storage, and the electronic warranty be stored in a second module. The accounting system and bookkeeping system may be an integrated system or two separate systems.

In practice, the accounting system may simply be supported on an external server or via cloud computing, and wherein the first module is a first folder on the server or cloud, and the second module is a second folder on the server or cloud.

The accounting system may for instance automatically upload the price and information to an external bookkeeping system or Enterprise Resource Planning (ERP) system, which for instance may be any system commercially available on the market, such as but not limited to SAP and Microsoft AX.

In a highly advantageous embodiment, the accounting system further extracts or calculates and stores a date related to expiry of a warranty. The accounting system is configured for generating a warning message which is sent to the user a predetermined number of days before the expiry of the warranty. Thus, the user receives a reminder of the expiry of the warranty, whereby the user is able to check the purchased item a final time for possible defects within the warranty period.

The accounting system may advantageously additionally generate and store the date related to an expiry based on national or regional laws of the location of the point-of-sale. The accounting system or software program associated therewith may continuously be updated with changes in national law so that the user at all times is ensured that the warranty laws are complied with.

According to a preferred embodiment, the method further provides a user generated electronically stored profile for the user, wherein the user profile comprises information about the user and associated bank account and credit and debit card details. The user profile is preferably stored on the accounting system. The user profile may further be accessible from a front end, such as a PC or a smart device via a software application installed on the front end or via a web-based access.

In another preferred embodiment, accounting details related to the accounts associated with the user profile are automatically balanced with the amount and information about the purchased item received from the point of sale.

In a highly advantageous embodiment, the method further comprises generating and storing information on a budget for said user. The budget information may be stored in the user profile and configured by the user, or alternatively, by for instance a bank, credit card provider, or debit card provider. In a particular advantageous embodiment, the accounting system automatically generates a warning message and sends this message to the user, if the purchase in step a) exceeds the budget for said user.

In one embodiment, the bookkeeping module comprises an electronically stored chart of accounts, and wherein the price and information is automatically electronically stored in said chart of accounts.

In a first embodiment, the point-of-sale computing device extracts price and information about the item and electronically sends said price and information about the item to the user's computer based accounting system, which may thus be sent separately along with the electronic receipt. In other words, the point-of-sale extracts the price and information about the purchased item and sends these to the accounting system.

In a second embodiment, the user's computer based accounting system extracts the price and information from the electronic receipt. In this setup, the point-of-sale only needs to send the electronic receipt, and the accounting system extracts the needed information for balancing of accounts and bookkeeping.

The information about the item may comprise any combination of information from the group of: purchase date, purchase time, name of the point-of-sale, location, price, number of purchased items, category of each purchased item, manufacturer, taxes paid, product identifier code (such as a UPC barcode or other scannable or computer readable product identifier), purchase date, purchase time, name of the point-of-sale, location, price, purchased items, category of purchased item, and the like.

In an advantageous embodiment, the user in step a) purchases a plurality of items, and wherein the point-of-sale computing device generates a separate electronic receipt for each item in step b) and/or the user's computer based accounting system in steps e) and f) extracts price and information for each item and stores said price and information in separate electronic records for each item. A purchase often involves more than one item. The method according to the invention may automatically divide such a purchase into separate records, such that each purchased item is properly balanced and entered into the bookkeeping records.

In general, the point-of-sale computing device should generate and send the amount and information about each separate post or purchased item, but should also generate and send the total amount, which is used to balance the bank account or credit and debit card account.

The user may use a debit card, a credit card or a mobile phone or other utilities for purchasing the item.

In one embodiment, the price and information about the purchased item is electronically sent to a provider of the debit card, credit card or mobile phone. Accordingly, the credit card company, bank or the like is also informed about the purchase, and an associated account may be automatically balanced or updated.

In an advantageous embodiment, the point-of-sale or accounting system further store information related to the item purchased in step a), and wherein the point-of-sale computing device or the point of sales accounting system is configured to generate an offer and/or advertising profile based on or associated with said item, so that the point-of-sale may send offers and/or advertisements to the user based on the items purchased. Thus, the point-of-sale may provide customised and targeted offers and/or advertisements to a user based on a purchase history. The user may advantageously accept or decline the offers and/or advertisements which are sent to the user. In practice this may be achieved by the user electronically ticking on or off a particular box in the user profile, or this may be achieved by accepting or declining these communications following each purchase.

According to a second aspect, the invention provides a computer based system for handling purchase transactions between a user and point-of-sales, wherein the system comprises a user generated and electronically stored profile and a point-of-sale computer based accounting system programmed for bookkeeping and archiving receipts, wherein the user profile comprises information about the user and associated bank, credit and debit account details, wherein the system further comprises:

a receipt module for generating an electronic receipt for an item purchased by the user at the point-of-sale, a transmitter for transmitting the electronic receipt to the accounting system, and wherein the system for handling purchase transactions comprises an extraction module for extracting price and information about a purchased item, and wherein the accounting system comprises:

a receipt storage module for storing electronic receipts, and a bookkeeping module for electronically storing the price and information about the purchased item.

Thereby, the invention provides a computer based system, where purchased items may automatically be entered into accounts, and where balancing of bookkeeping records is automatically carried out upon a purchase of such items. Further, the receipts are automatically electronically stored in a database, whereby a user at any time can check the receipts for possible errors with a local computing device such as a smart phone.

The management of the system may happen in real time, especially if the user profile is set up for automatic handling certain purchase transactions. This may be a general feature or set up for one or more specific points of sales or for specific items, such as airfare. The user profile can also be set to suggest certain handling for certain point of sales which are then confirmed by the user. Accordingly, the system preferably comprises a plurality of point-of-sales. However, the user can also directly enter data such as price and information and receipts manually for points of sale that do not have a computing device configured for transmitting an electronic receipt, via a front-end immediately after a purchase, by key entry, local scanning or other data entry means and after the price and information and receipt have been received. This allows posting the purchase so as to balance the accounts and to also to electronically store the receipt.

The receipt module and transmitter may advantageously be implemented at the point-of-sale.

The bookkeeping, balancing and storage may be carried out in real-time, whereby the user can instantly access his or her account to check the records.

The point-of-sale may be a physical shop or an online shop, or in other words any seller of items. So the purchase may be made either in the physical shop and the item bought via a point-of-sale terminal, or the purchase may be carried out via the Internet. This can for instance be a single payment or a recurring payment (standing order mandate) via net banking.

The user may be a consumer or a buyer.

The purchase item may be consumer goods or the like.

The account details may comprise a credit card number, debit card number, bank account number, phone number or the like associated with the user.

The accounting system may of course also be provided with a transmitter and receiver for receiving electronic communication.

In a first embodiment, the extraction module is integrated in the first-point-of sale computing device or terminal. Thus, the point-of-sale device extracts the needed information and electronically sends this to the accounting system.

In a second embodiment, the extraction module is integrated in the point of sale's computer based accounting system. Thereby, the accounting system may extract the needed information, e.g. from the electronic receipt, which may simplify the system from the seller's perspective.

In a preferred embodiment, the accounting system is resident on an external server or cloud server. Thus, the accounting system may in practice be managed by a software program installed on the external server or cloud server, and which provides a user access to his or her accounts via the Internet from a computing device, smart phone, tablet, etc.

In another preferred embodiment, the point-of-sale computing device further comprises a warranty module for generating an electronic warranty associated with the purchased item, and the user's accounting system comprises a warranty storage module for storing the electronic warranty. Thereby, warranties for purchased items are automatically generated and stored in the system, and the user may access a record of warranties for purchased item at any time.

According to one embodiment, the first-point-of sale may send the price and information as well as receipt etc. related to the purchased item directly to a service provider, such as a credit card provider or debit card provider, which may then relay the received information to an external server. Alternatively, the point-of-sale may send the information to both the service provider and external server. In practice, the system and servers of the service provider may be perceived as a separate system or part of the overall accounting system.

BRIEF DESCRIPTION OF THE DRAWINGS

The invention is explained in detail below with reference to embodiments shown in the drawings, in which.

DETAILED DESCRIPTION OF THE INVENTION

Figure 1:
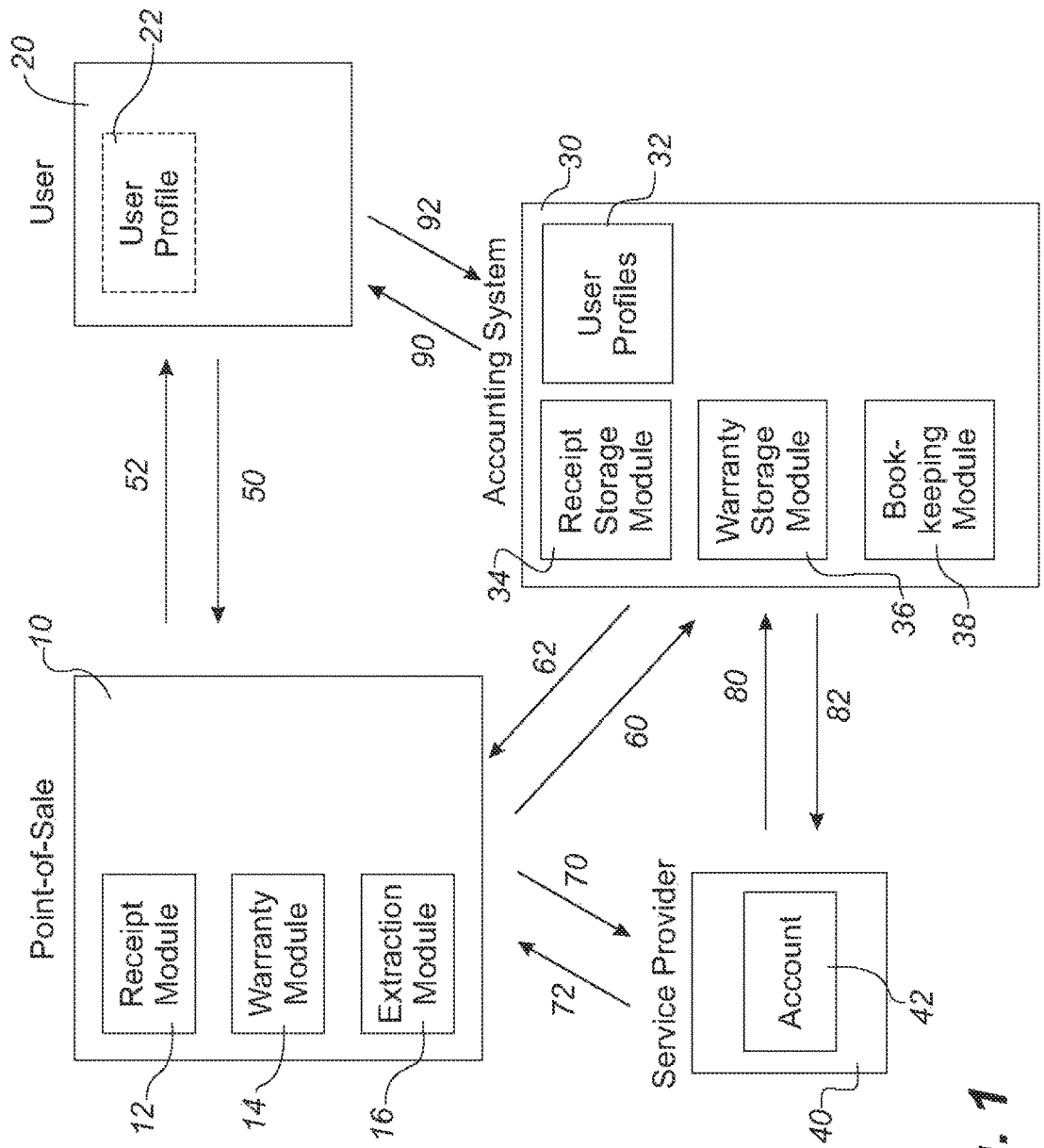
FIG. 1 shows one embodiment of a computer based system for handling and storing purchase transactions between a user and point-of-sales according to the invention.

A computer based system for automatically handling and electronically storing purchase transactions between a user's computer based accounting system and point-of-sales computing device is depicted in FIG. 1.

The system comprises a number of point-of-sales computing devices 10, where the points of sale may be in form of a physical store or an online store or a company, and a user's computer based accounting system 20. The point-of-sale computing device 10 has a receipt module 12 for generating electronic receipts, a warranty module 14 for generating electronic warranties, and an extraction module

16 for extracting a price and information about an item for sale. The extraction module 16 may also be implemented at the user's computing device 20, e.g. in an app installed on a smart phone, via bar code scanner, or via other methods for obtaining the price and information in an electronic form.

When the user purchases (illustrated with arrow 50) an item (or items) from the point-of-sale, the point-of-sale computing device 10 is programmed to generate an electronic receipt related to the purchased item via the receipt module 12, and an electronic warranty related to the purchased item via the warranty module 14. The point-of-sale computing device 10 further extracts a price and information about the purchased item via the extraction module 16. The point-of-sale computing device 10 may send the electronic receipt to the user's computing device 20 or print a physical receipt to the user 10 (as illustrated with arrow 52. However, the system according to the invention makes the necessity of physical receipts superfluous. The purchase may be carried out via a point-of-sale terminal in a physical shop and the user may use a debit card, a credit card or a mobile phone for the payment. If the purchase is carried out online, the user may enter a credit card number or debit card number or other into the system in order to facilitate the payment.

The point-of-sale computing device 10 sends (illustrated with arrow 60) the electronic receipt, the electronic warranty, and the price and information about the purchased item to the user's computer based accounting system 30. This will be carried out electronically, and may be carried out via an email, a document transfer, text message, MMS or the like. The point-of-sale computing device 10 may further relay (illustrated with arrow 70) the price and information about the purchased item to a computing device or program associated with a service provider 40, such as a credit card provider, a bank or the like. The service provider 40 maintains an account 42 associated with the user, e.g. the credit card or debit card of the user. Accordingly, the account 42 at the service provider 40 may automatically be updated and balanced by entering the transaction information, automatically sending the post to the service provider 40, thus balancing the bank account or credit/debit card account so that it is clear which payment has been checked off.

Further, as known from prior art systems, if there is not sufficient funds in the account 42, the service provider 40 may send a warning (illustrated with arrow 72) to the point-of-sale computing device 10 and the purchase may be cancelled.

The information about the location or address, e.g. a telephone number, IP-address, or email address, of the user's accounting system 30 may be associated with the user profile 22 or by the payment method or account used. Thus, the point-of-sale computing device 10 may receive the information about the location or address from the user's electronically stored profile 22 or the payment method, after which the point-of-sale computing device 10 sends the information and price about the payment as well as the electronic receipt to said location or address. The information about the location and address may also be provided by the user at the time the sale is made. Thus, the system may also be able to handle cash purchases.

The user's computer based accounting system 30 may be provided by a software program, which is installed on an external server or cloud server. The accounting system 30 comprises a number of user profiles 32 associated with different user profiles or companies. The accounting system 30 further comprises a electronic receipt storage module or folder 34, an electronic warranty storage module or folder 36, and a bookkeeping module 38 programmed for performing bookkeeping operations, such as balancing accounts, generating reports, and analysis of spending and budget based on user configured parameters. Once the electronic receipt, the electronic warranty, and the price and information about the purchased item is received by the accounting system 30, the electronic receipt is stored in the receipt storage module 34, and the electronic warranty is stored in a warranty storage module. Further, the price and information about the purchased item is entered into the bookkeeping module associated with a user profile of the user. Thereby, the bookkeeping records are automatically updated upon purchase of an item. Further the receipt and warranty are automatically stored in the accounting system 30, whereby the user can check the receipt and warranty for possible errors. In practice, the receipt may also function as the warranty, in which case only the receipt needs to be stored or duplicated.

In the shown embodiment, the price and information about the purchased item is sent directly to the accounting system 30. However, it may also be relayed to the accounting system 30 via the service provider 40, in which case the service provider 40 may be perceived as taking the part of the point of sale computing device 10. In yet another embodiment, the price and information is sent to the user's computing device 20, e.g. to a smart phone or PC of the user 20, which then relays the information to the accounting system 30. This may occur via Near Field Communication (NFC) using short distance wireless transmission technology such as Bluetooth® wireless transmission, or via another P2P transmission system. The point of sale communication device or the user's computing device may initiate communications, with verifications exchanged so as to assure that the purchase information exchange is enabled only as to the purchases in progress, so as to avoid misdirection of the purchase information to other purchasers. The verification parameters can be established as part of the user profile, so that the point of sale computing device has a reference for performing the validation prior to the exchange of information. Alternatively, validation can be by way of the service provider, such that approval of the purchase by the service provider additionally is a validation of the identity of the purchaser so that the transmission of the electronic receipt, information and/or warranty can proceed. This validation can also occur via an internet connection with the user's stored profile, with the user providing electronically or otherwise linking information.

The bookkeeping module 38 may be installed on the external server. However, it may also be installed on an additional server. The bookkeeping module 38 may for instance be an Enterprise Resource Planning (ERP) system, such as SAP, in which case the price and information about the purchased item need not to be store on the external server or cloud server. However, in a preferred embodiment, the bookkeeping module 38 is stored on the external server and balanced upon receipt of price and information about the purchased item. If an ERP system or the like needs to be updated, the accounting system 30 may relay the price and information to the ERP system (not shown). This may be particular advantageous for companies or firms.

In the shown solution, the extraction module 16 is implemented at the point-of-sale computing device 10, such that the point-of-sale computing device 10 extracts and sends the price and information about the purchased item to the accounting system 30. However, the extraction module 16 may be implemented on the user's accounting system 30 instead, and the extraction module may for instance extract the price and information about the price from the electronic receipt.

The information about the purchased item may comprise one or more of the following: purchase date, purchase time, name of the point-of-sale, location, price, product name, manufacturer name, product type or category, and the like. Thus, a number of details may be stored in the bookkeeping module, which may be important for accounting and tax purposes.

The user profile 32 may be configured to include an associated budget, e.g. a forecast of spending for an individual or a family, or a maximum spend per day or per month. If the budget has been exceeded, the accounting system 60 may transmit a warning message (illustrated with arrow 62), with the possibility for configuring the user's accounting system to cancel the purchase. The accounting system 62 may also send (illustrated with arrow 82) the warning message to the service provider 40.

Once a purchase has been completed, the accounting system 30 may also update the user profile 32 associated with the user, e.g., updating a purchase history and an offer/advertising profile. The accounting system 30 may send the offer/advertising profile to the point-of-sale computing device 10 and other points-of-sales, i.e. shops, whereby the point-of-sale computing device may then generate and send targeted offer/advertisements to the user 20 based on the user's purchase history. The user will have an option to accept or decline such targeted advertisements, and may also configure whether this occurs as part of the user's profile, that is, whether the user is willing to share this purchase information. The user may also configure their computing device to request that an offer/advertising profile be set up, in which case, the user does not have to accept or can decline the targeted offers/advertisements.

The user may have access to his or her user profile 22 and account details via a front end that mirrors the user profile 32 maintained on the accounting system 30. The front end may be a software program installed on a PC or a MAC, or it may be a software application installed on a smart device, such as a smart phone or a tablet. The front end may also be web-based so that the user may access the user profile 22 and account details from anywhere. The user may thus access the user profile 22 and account details from anywhere via the app or the web-based access. The accounting system 30 pushes (illustrated with arrow 90) the updated user profile and account details to the front end. The user may update the user profile 22 via the front end, which is then sent to the accounting system 30 (illustrated with arrow 92). The user may set preferences, such as budgets, advertising preferences and the like.

It is possible for a user to set up a plurality of user profiles. Thereby, the user can have several bookkeeping records and accounts balanced. The bookkeeping records and accounts of the plurality of user profiles may be shown separately, but may also be combined to show complete bookkeeping records and accounts. This is particular relevant for companies and firms, which may have several employees and departments. Thus, the system allows showing the spending of separate users or departments and for the entire company or firm.

The purchase may comprise a plurality of items. In such a case, the point-of-sale computing device may generate a separate electronic receipt and possibly generate an electronic warranty for each item. The price and information about each item is extracted and stored in separate records in the bookkeeping module 38, such that each purchased item is properly balanced and entered into the bookkeeping records.

The entire system is updated in real-time. Thus, the user having for instance a mobile phone may instantly access his or her account to check the records to see if any errors have occurred, but more importantly to check off purchases and balance the accounts as well as for storing the electronic receipts.

Figure 2:
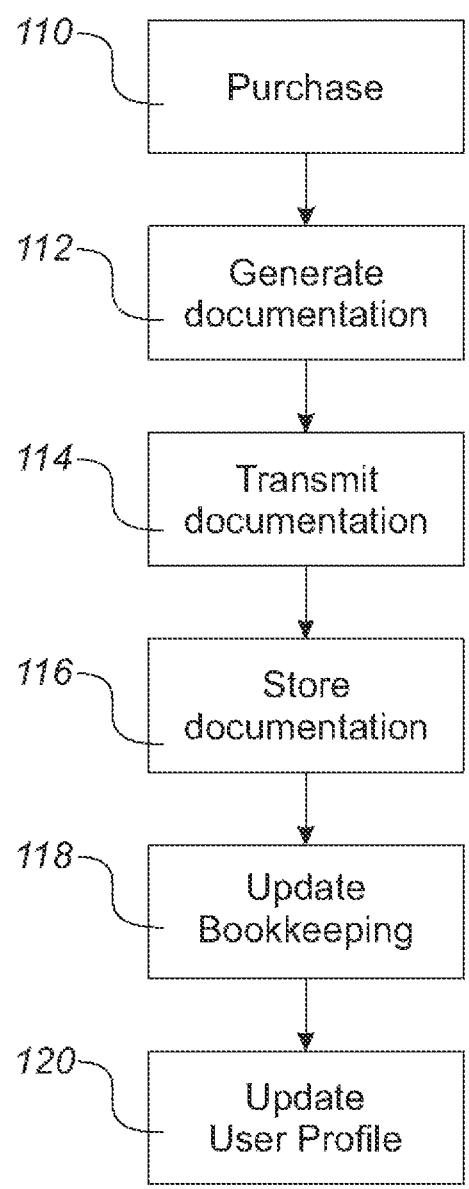
FIG. 2 shows steps in a method for handling and storing purchase transactions between a user and point-of-sales according to the invention.

FIG. 2 illustrates the method for handling and storing purchase transactions between a users' computing device and a point-of-sales computing device according to the invention.

In a first step 110, a user purchases an item from a point-of-sale, either in a physical shop or via an online shop. In a second step 112, the point-of-sale computing device generates electronic documentation. The documentation may comprise an electronic receipt, an electronic warranty, and a price and information about the purchased item. The electronic documentation is then in a third step 114 transmitted to the accounting system via the communications protocols discussed above, either directly through the users' local computing device, via the internet, etc. In a fourth step 116, the electronic documentation is stored in the user's computer based accounting system. The accounting system may for instance store the electronic receipt in a dedicated folder on a server, where the dedicated folder may be associated with the user's electronically generated and stored profile of the user. The accounting system may further store the electronic warranty in a dedicated folder. The user may be prompted to decide if the electronic receipt itself should be stored as an electronic warranty. In a fifth step 118, the bookkeeping records and accounts related to the user's user profile are updated and balanced automatically by the users' computer based accounting system in real time. Further, the users' electronic profile may in a sixth step 120 be updated, e.g. to reflect a purchase history and purchase preferences.

The accounting system may automatically generate a warning message based on user configured parameters and send this message to the user's local computing device, i.e., smart phone, tablet, etc., if the purchase exceeds a predetermined budget for said user.

The accounting system may further store a date about an expiry of a warranty and be programmed for generating and sending a warning message to the user a predetermined number of days before the expiry of the warranty. Thus, the user receives a reminder of the expiry of the warranty, whereby the user is able to check the purchased item a final time for possible defects within the warranty period. The accounting system may advantageously generate and store the date about the expiry of the warranty based on national or regional laws of the location of the point-of-sale. The system or software program may continuously be updated with changes in national law so that the user at all times is ensured that the warranty laws are complied with.

The user's accounting system (or the point-of-sale computing device, which may also keep a record of the user's purchase) may, if permitted by the users' profile, generate targeted electronically transmitted advertisements, which may be pushed to the user's front end. The user may accept or decline to receive advertisements, which can be set up by editing the preferences of the user profile.

The user's accounting system 30 and the user's computing device 20 have been shown as two different systems, i.e. a smart phone or PC of the user, and an external server 30 for the accounting system. However, in a simple embodiment, the accounting system 30 may also be implemented on the PC or smart phone 20 of the user.

The invention has been described with reference to advantageous embodiments. However, the scope of the invention is not limited to the illustrated embodiments, and alterations and modifications can be carried out without deviating from the scope of the invention, which is defined by the claims.

The invention claimed is:

1. A method comprising handling and storing an electronic sales receipt, thereby updating an account system in real time, and handling and storing information relating to the electronic sales receipt when a user purchases an item from a point-of-sale comprising a computing device, the method further comprising:
   (a) a user purchases an item from the point-of-sale, the user pays with a credit card, a debit card, a mobile phone, a bank account or another payment method or device, thereby providing an electronic identification parameter which is unique for the user, software on the point-of-sale computing device compares the electronic identification parameter with a list of electronic identification parameters each pointing to and identifying a user profile in a database accessible from the point-of-sale computing device, which user profile at least comprises an electronic communication address of the user and one or more parameters defined by the user profile providing a pre-defined account plan and account plan number for certain values of a purchase related parameter,
   (b) the point-of-sale computing device generates an electronic sales receipt and information that includes a list of purchase related parameters including at least a name of the point-of-sale, a purchase date, and a price relating to the purchase, and sends the electronic sales receipt and the purchase related parameters to the electronic communication address of the user,
   (c) once the electronic sales receipt and purchase related parameters are received at the electronic communication address of the user, then an account plan and an account plan number relating to the purchase are identified based on the following procedure:
      a parameter of the purchase related parameters is compared with a list of parameters defined by the user profile which list may provide a pre-defined account plan and account plan number for certain values of the parameter, and
      if the parameter exists on the pre-defined list of parameters in the user profile, the electronic sales receipt and the related information is allocated to the account plan and account plan number specified for the parameter and then the electronic sales receipt and the purchase related parameters are automatically stored in the account plan in a computing device of the user, and
   (d) after an electronic receipt is received that does not include all purchase related parameters, the computing device of the user either extracts the purchase related parameters, or the user directly enters the purchase related parameters manually by key entry on a front end of the computing device of the user, local scanning or another data entry method using a computing device of the user, the electronic sales receipt and the purchase related parameters are then automatically stored in an account plan and an account plan number related to said electronic sales receipt,
   wherein the account plan is a part of a bookkeeping module in which the bookkeeping module receives and stores the electronic sales receipt and the purchase related parameters for automatically analyzing and updating accounting records in real time, and sends a message based on user configured parameters to the computing device of the user, whereby the user can also instantly access the user profile and account to check the records via the front end of the computing device of the user that mirrors the user profile maintained on the account system.

2. The method according to claim 1, wherein the analysis of the electronic sales receipt and the purchase related parameters includes generating and storing an expiry date of a product warranty based on national or regional laws of a location of the point-of-sale computing device.

3. The method according to claim 1, wherein analyzing and updating of the records in real time relating to spending and budget based on user configured parameters cause the bookkeeping module to generate a warning message based on user configured parameters and send this message to a local computing device of the user.

4. The method according to claim 1, wherein the purchase related parameters may comprise any combination from the group of: purchase time, location, that is, address of vendor, number of purchased items, category of each purchased item, manufacturer, taxes paid, product identifier code that is scannable or computer readable.

5. A system comprising an accounting system and a point-of-sale computing device, for handling and storing an electronic sales receipt, including updating the accounting system in real time, and handling and storing information relating to the electronic sales receipt when a user purchases an item from the point-of-sale computing device, the system configured to perform the following steps:
   a) a user purchases an item from the point-of-sale, the user pays with a credit card, a debit card, a mobile phone, a bank account or another payment method or device, thereby providing an electronic identification parameter which is unique for the user, software on the point-of-sale computing device compares the electronic identification parameter with a list of electronic identification parameters each pointing to and identifying a user profile in a database accessible from the point-of-sale computer device, which user profile at least comprises an electronic communication address of the user and a list of parameters defined by the user profile providing a pre-defined account plan and account plan number for certain values of a purchase related parameter,
   b) the point-of-sale computing device generates an electronic sales receipt and information that includes a list of purchase related parameters including at least a name of the point-of-sale, a purchase date, and a price relating to the purchase and sends the electronic sales receipt and the purchase related parameters to the electronic communication address of the user;
   c) when the electronic sales receipt and purchase related parameters are received at the electronic communication address of the user, then an account plan and an account number relating to the purchase are identified based on the following procedure:
      a parameter of the purchase related parameters is compared with a list of parameters defined by the user profile which list may provide a pre-defined account plan and account plan number for certain values of the parameter, and
      if the parameter exists on the pre-defined list of parameters in the user profile, the electronic sales receipt and the related information is allocated to the account plan and account plan number specified for the parameter and then the electronic sales receipt and the purchase related parameters are automatically stored in the account plan in a computing device of the user, and d) if the point-of-sale computing device is not configured for transmitting both an electronic receipt and all purchase related parameters, then after an electronic receipt is received, the computing device of the user either extracts the purchase related parameters, or the user directly enters the purchase related parameters manually by key entry on a front end of the computing device of the user, local scanning or another data entry method using a computing device of the user, the electronic sales receipt and the purchase related parameters are then automatically stored in an account plan and an account plan number related to said electronic sales receipt, wherein the account plan is a part of a bookkeeping module of the accounting system in which the bookkeeping module receives and stores the electronic sales receipt and the purchase related parameters for automatically so analyzing and updating accounting records in real time, whereby the user can instantly access the user profile and account to check the records via the front end of the computing device of the user that mirrors the user profile maintained on the accounting system.

6. The system according to claim 5, wherein the analysis of the electronic sales receipt and the purchase related parameters includes generating and storing an expiry date of a product warranty based on national or regional laws of a location of the point-of-sale computing device.

7. The system according to claim 5, wherein analyzing and updating of the records in real time relating to spending and budget based on user configured parameters cause the bookkeeping module to generate a warning message based on user configured parameters and send this message to local computing device of the user.

8. The system according to claim 5, wherein the purchase related parameters may comprise any combination from the group of: purchase time, location, that is, address of the vendor, number of purchased items, category of each purchased item, manufacturer, taxes paid, product identifier code that is scannable or computer readable.

* * * * *